US008848350B2

(12) United States Patent
Kim et al.

(10) Patent No.: US 8,848,350 B2
(45) Date of Patent: Sep. 30, 2014

(54) SUPPORT STRUCTURE OF TOUCH PANEL

(75) Inventors: Jae Kyung Kim, Gyunggi-do (KR);
Dong Sun Park, Gyunggi-do (KR);
Yeon Ho Son, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 269 days.

(21) Appl. No.: 13/533,772

(22) Filed: Jun. 26, 2012

(65) Prior Publication Data

US 2013/0003270 A1 Jan. 3, 2013

(30) Foreign Application Priority Data

Jun. 28, 2011 (KR) .................. 10-2011-0063179

(51) Int. Cl.
*G06F 1/16* (2006.01)
*G06F 3/041* (2006.01)

(52) U.S. Cl.
CPC .............. *G06F 3/041* (2013.01); *G06F 1/1643* (2013.01); *G06F 1/1626* (2013.01)
USPC ....... 361/679.21; 345/177; 200/512; 248/448

(58) Field of Classification Search
USPC ........... 248/121, 206.5, 448, 122.1, 398, 688,
248/188.8; 345/173, 174, 204, 690, 168,
345/177, 520, 156, 158, 650, 161; 455/566,
455/575.1; 200/534, 295, 5 A, 512, 52 R;
174/250, 254, 261; 312/223.1, 223.2;
361/807, 679.01, 679.3, 679.16,
361/679.09, 679.02, 679.4, 679.21, 679.27,
361/679.55, 679.22, 679.06
See application file for complete search history.

(56) References Cited

U.S. PATENT DOCUMENTS

2013/0003339 A1\* 1/2013 Chen et al. .................... 361/807
2014/0125597 A1\* 5/2014 Lee et al. ...................... 345/173

FOREIGN PATENT DOCUMENTS

JP 2008-261987 10/2008
KR 10-2006-0089645 8/2006

OTHER PUBLICATIONS

Office Action dated Feb. 7, 2013 for related Korean Patent Application No. 10-2011-0063179 and its English summary provided by the clients.

\* cited by examiner

*Primary Examiner* — Hung Duong
(74) *Attorney, Agent, or Firm* — Ladas & Parry, LLP (57) ABSTRACT

Disclosed herein is a support structure of a touch panel. According to the present invention, by implementing a touch panel support structure having the maximum resistance to vibration and warpage transferred to the touch panel by a vibration generating device, it is possible to uniformize a vibration width by minimizing a deviation of vibration displacement for each position of a touch panel and it is possible to safely protect the touch panel by effectively absorbing external shock through a cushion operation of a buffering member.

8 Claims, 7 Drawing Sheets

FIG. 1A

Prior art

FIG. 1B

Prior art

FIG.2A

Prior art

FIG.2B

Prior art

SUPPORT STRUCTURE OF TOUCH PANEL

CROSS REFERENCE TO RELATED APPLICATION

This application claims the benefit of Korean Patent Application No. 10-2011-0063179, filed on Jun. 28, 2011, entitled "Support Structure for a Touch Panel" which is hereby incorporated by reference in its entirety into this application.

BACKGROUND OF THE INVENTION

1. Technical Field

The present invention relates to a support structure of a touch panel.

2. Description of the Related Art

With the development mobile communication technologies, terminals such as a cellular phone, a PDA, and a navigation have extended their functions as more various and complicated multimedia providing means such as audio, video, wireless Internet web browser, and the like in addition to just display means of text information. Therefore, implementation of a larger display screen within the limited size of electronic information terminal has been required, and as a result, a display scheme adopting a touch panel has been further attracted public attention.

Meanwhile, in portable electronic apparatuses such as a cellular phone, a game machine, an e-book, and the like, a vibration function has been used for various purposes. In particular, a vibration generating device performing the vibration function is mounted on a mobile apparatus adopting the touch panel such as the cellular phone to be used as a sensing function of a reception signal to a transmission signal.

As the vibration generating device is applied to the touch panel, a demand for a haptic device allowing a user to immediately recognize feedback vibration to user's touch input has been increased.

In recent years, a demand of a consumer has been reflected, such that there has been a trend of gradually extending the size of the touch panel. However, when the vibration generating device is applied to a touch panel having a large plane size (e.g., a touch panel a screen size of 2.5 inch or more), the touch panel cannot perform entirely uniform translation movements and a vibration displacement amount varies partially according to the position.

Figure 1A:
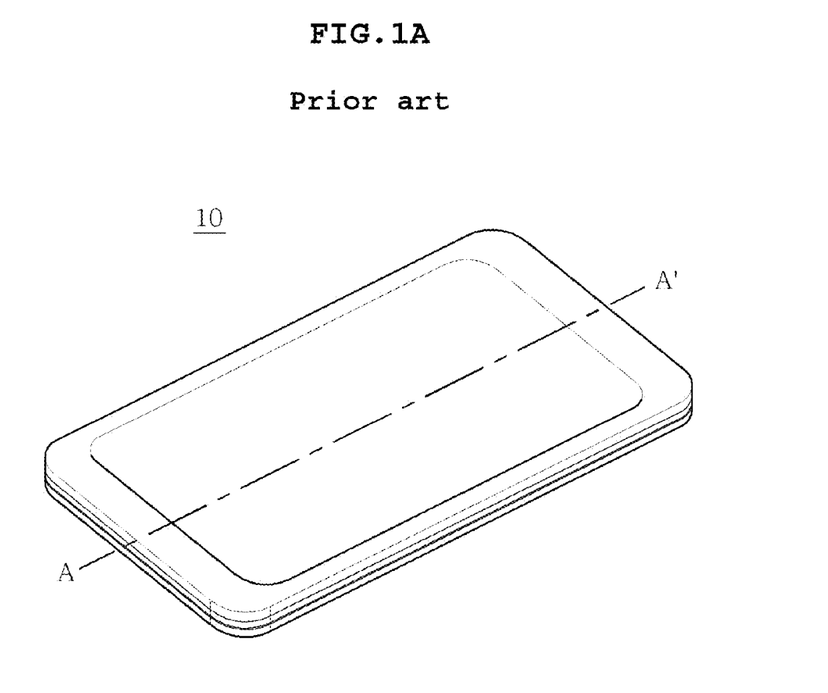
FIG. 1A is a perspective view of a touch panel by a support structure in the prior art.
Figure 1B:
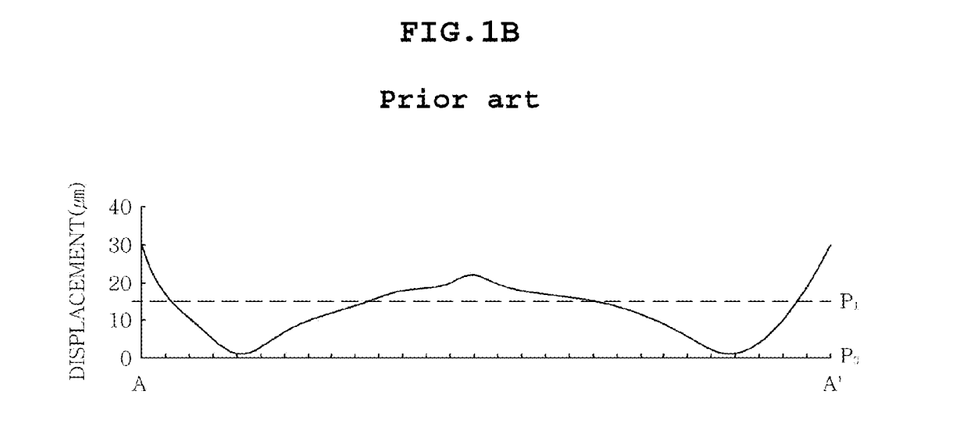
FIG. 1B is a diagram showing a displacement amount for each partial position of a touch panel by a support structure in the prior art.
Figure 2A:
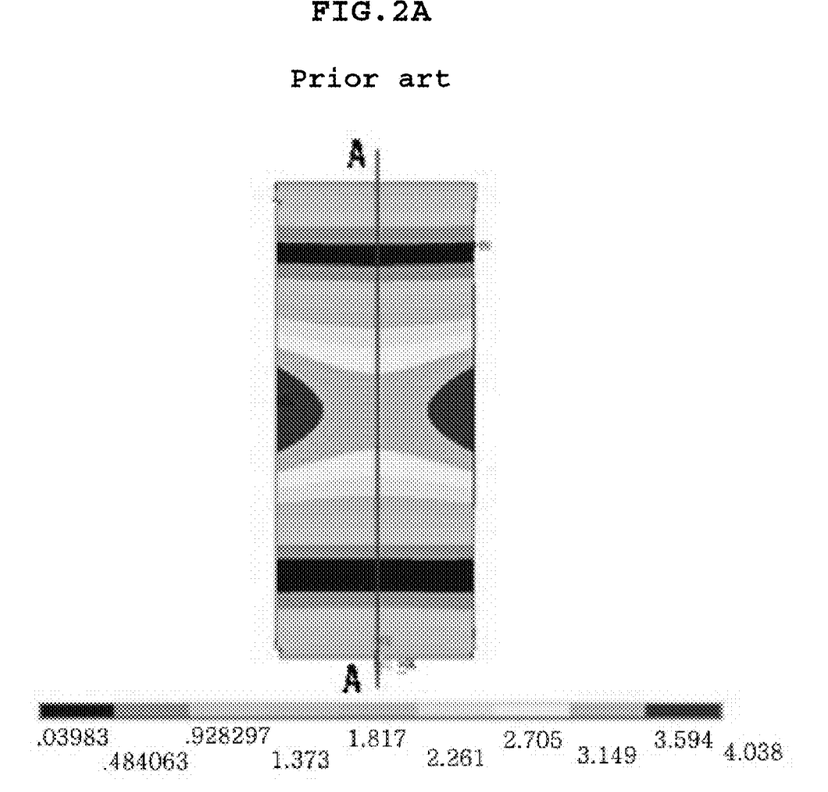
FIG. 2A is a diagram showing simulation of a displacement amount for each position of a support structure of the touch panel shown in FIG. 1.
Figure 2B:
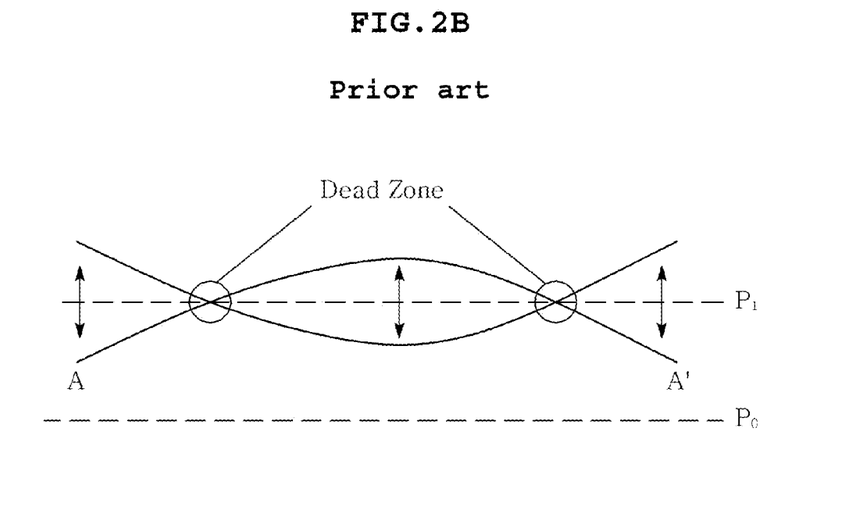
FIG. 2B is a graph showing a displacement amount for each position of a support structure of the touch panel shown in FIG. 1.
Figure 3:
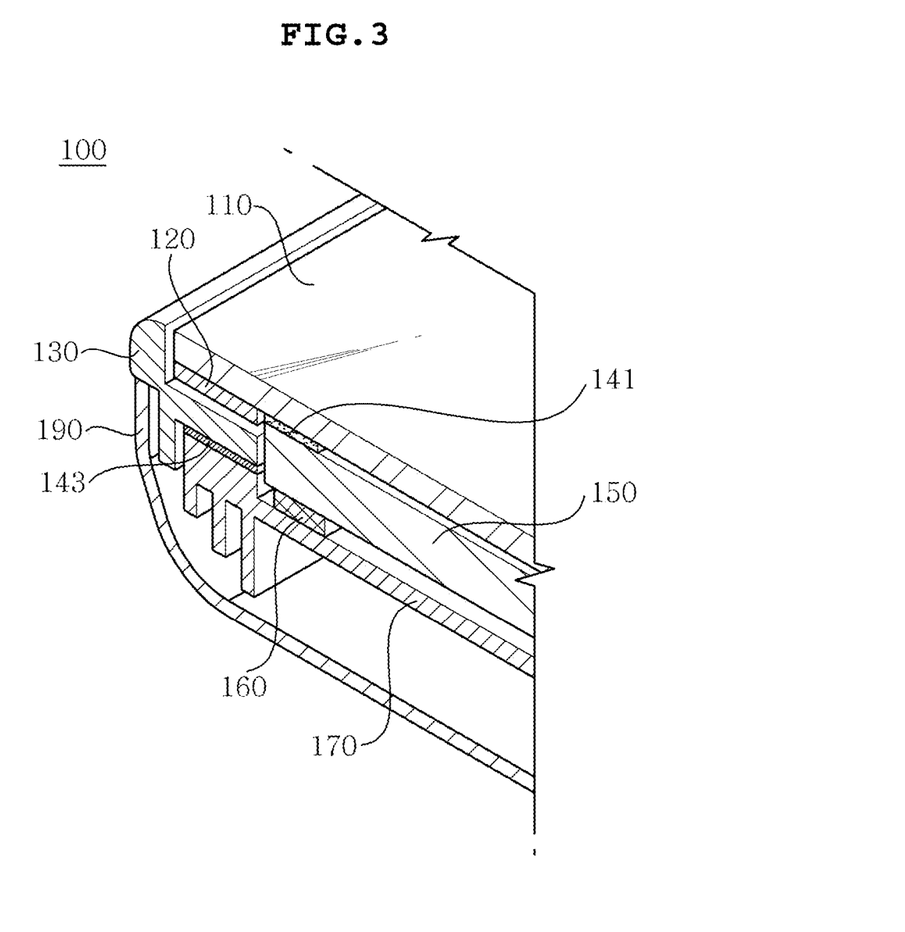
FIG. 3 is a perspective view of a support structure of a touch panel according to a preferred embodiment of the present invention.
Figure 4:
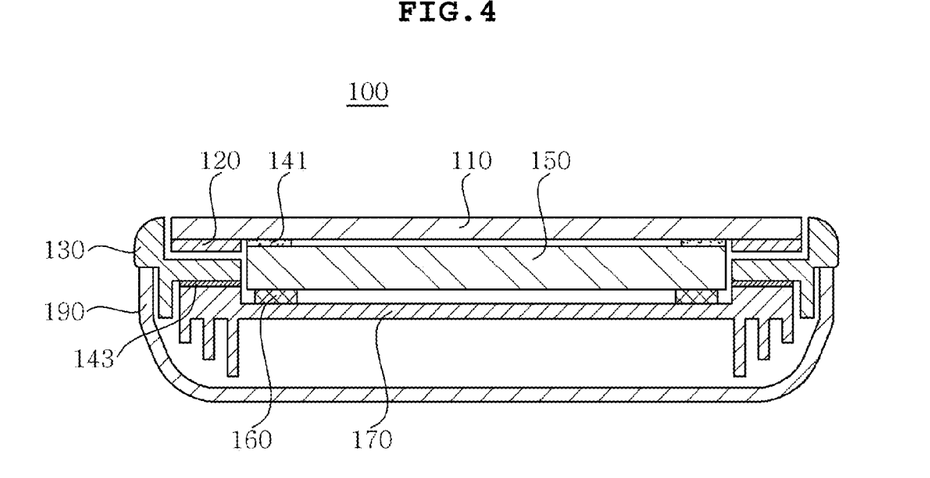
FIG. 4 is a cross-sectional view of a support structure of a touch panel according to a preferred embodiment of the present invention.

FIG. 1 is a diagram showing a displacement amount for each position of the touch panel according to vibration generated from the inside of a touch panel support structure 10 in the prior art. The positional displacement amount measured along a longitudinal center line A-A' on which the positional displacement width of the touch panel (see FIG. 1A) is measured as the largest value is shown in FIG. 1B. Further, a case in which the displacement amount according to the position is simulated is shown in FIG. 2. As shown in the figure, the displacement width is the largest at the center and both ends of the center line (FIG. 2A) and the displacement is substantially close to zero at a predetermined position between the center and both ends (FIG. 2, dead zone). In addition, as the plane size of the touch panel increases, a deviation of the displacement for each position further increases.

SUMMARY OF THE INVENTION

The present invention has been made in an effort to provide a support structure of a touch panel in which vibration displacement of the touch panel is maintained uniformly by implementing a touch panel support structure having the maximum resistance to vibration and warpage transferred to the touch panel by a vibration generating device.

According to a preferred embodiment of the present invention, there is provided a support structure of a touch panel including: a touch panel; a buffering member attached to a periphery of the bottom surface of the touch panel; and an upper supporter including a main frame having the top surface contacting the buffering member to support the touch panel, a side frame extending from an outer periphery of the main frame to surround a periphery of the side surface of the touch panel, and a deformation stopping frame protruding downward of the bottom periphery of the main frame to suppress warpage of the main frame, which are integrally formed therein.

Herein, the support structure of a touch panel may further include: an image display unit attached to the bottom surface of the touch panel; and a bracket including a base plate in which a peripheral surface of the top surface thereof is attached to the bottom surface of the main frame and a center surface of the top surface contacts the bottom surface of the image display unit to support the image display unit and a vibration stopping plate protruding downward from the bottom surface of the base plate to suppress vibration of the base plate, which are integrally formed therein.

Further, the support structure of a touch panel may further include a lower supporter coupled with the main frame of the upper supporter to protect the image display unit and the bracket.

In addition, the support structure of a touch panel may further include a vibration generating member attached to the bottom surface of the image display unit.

The vibration generating member may be a linear vibrator or a piezoelectric actuator.

The support structure of a touch panel may further include two or more deformation stopping frames that protrude downward with being spaced toward the inside of an outermost periphery of the bottom surface of the main frame constituting the upper supporter by a predetermined gap.

The support structure of a touch panel may further include two or more vibration stopping plates that protrude downward with being spaced toward the inside of an outermost periphery of the base plate constituting the bracket by a predetermined gap.

An adhesive member may be interposed between the image display unit and the touch panel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description will be omitted.

Hereinafter, a preferred embodiment of the present invention will be described in detail with reference to the accompanying drawings.

A support structure 100 of a touch panel according to a preferred embodiment of the present invention basically includes a touch panel 110, an upper supporter 130, and a buffering member 120 interposed between the touch panel 110 and the upper supporter 130.

The touch panel 110 is installed on display surfaces of flat panel display devices such as an electronic note, a liquid crystal display (LCD), a plasma display panel (PDP), electroluminescence (EL), and the like and an image display device such as a cathode ray tube (CRT) to be used for a user to select desired information while viewing the image display device. Types of the touch panel 110 are classified into a resistive type, a capacitive type, an electro-magnetic type, a surface acoustic wave (SAW) type, and an infrared type. Various types of touch panels 110 are adopted in electronic products by considering a problem in signal amplification, a difference in resolution, a difficulty in design and processing technique, an optical characteristic, an electrical characteristic, a mechanical characteristic, an environment-resistant characteristic, an input characteristic, durability, and economical efficiency and types used in the widest field at present are the resistive type touch panel and the capacitive type touch panel. In the preferred embodiment of the present invention, various types of touch panels may be adopted.

Figure 5:
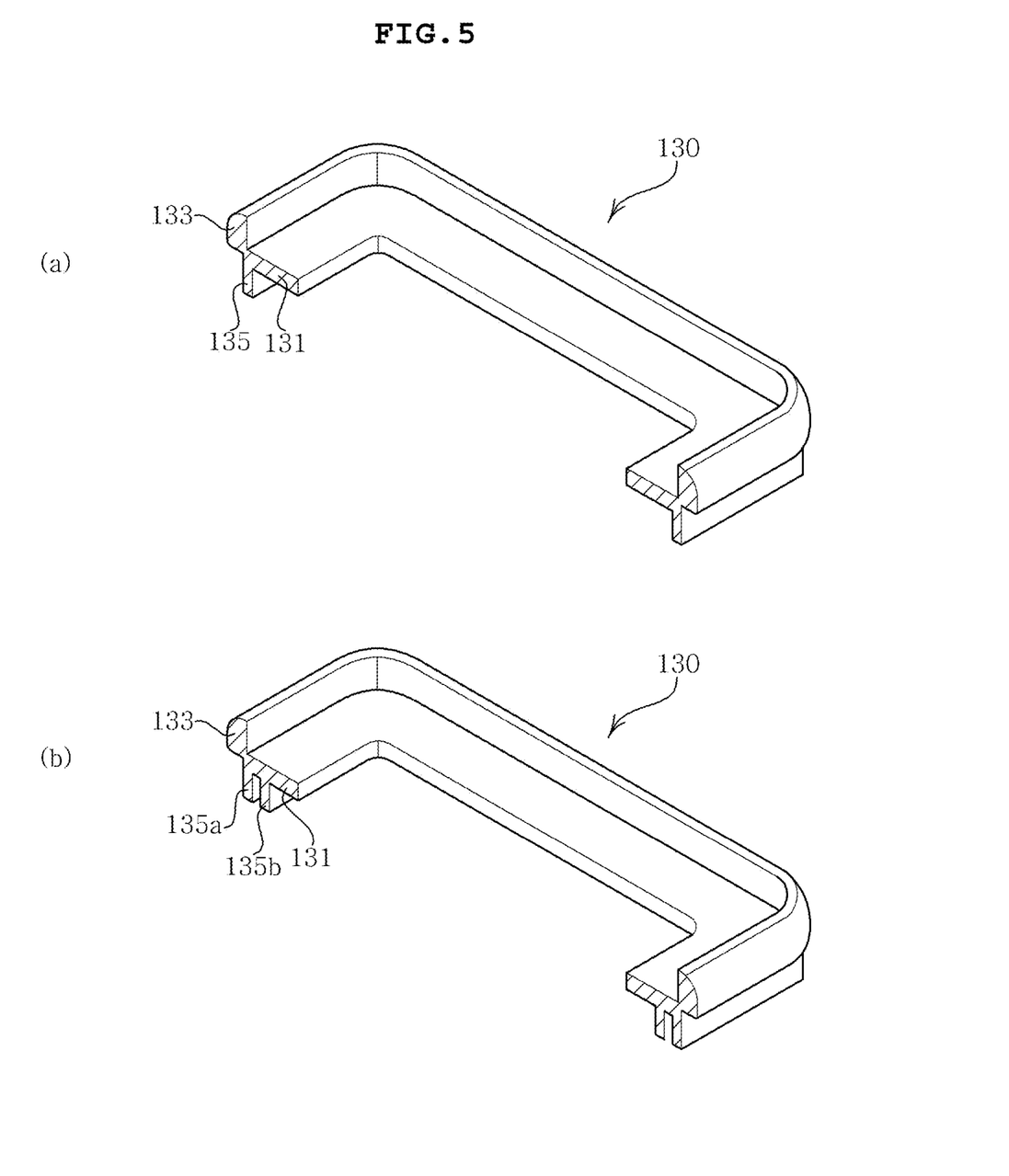
FIG. 5A is a perspective view of an upper supporter constituting the touch panel support structure of FIG. 3.
FIG. 5B is a perspective view of another upper supporter constituting the touch panel support structure of FIG. 3.

The upper supporter 130 which supports the bottom surface of the touch panel 110 includes a main frame 131, a side frame 133, and a deformation stopping frame 135 that are integrally formed as shown in FIG. 5. A first technological characteristic of the present invention is a structure of the upper supporter 130, which will be described below in detail.

The main frame 131 as a member supporting the bottom surface of the touch panel 110 is preferably designed so that an entire size thereof corresponds to a plane size of the touch panel 110 which is a PGG configuration. As shown in FIG. 5A, the main frame 131 may have a frame shape corresponding to only a bottom peripheral part of the touch panel 110 with the inside thereof opened and an image display unit 150 to be described below is positioned in an open region formed in the main frame 131. In addition, although not shown in the figure, the main frame may be configured in a wholly plane shape without an additional open region.

The side frame 133 extends from an outer periphery of the main frame 131 and covers a side periphery of the touch panel 110 positioned above the main frame 131. Therefore, the side frame 133 serves to stop plane movements of the touch panel 110 and as necessary, extends up to a part of a top periphery of the touch panel 110 to stop and fix upper movements of the touch panel 110.

In this case, the deformation stopping frame 135 protrudes on the bottom surface of the main frame 131 constituting the upper supporter 130. That is, the deformation stopping frame 135 protrudes downward on the bottom periphery of the main frame 131 and the deformation stopping frame 135 protrudes downward from each of four peripheries of the main frame 131, which are connected to each other in a square shape. Further, the main frame 131 may protrude to only long-direction left and right peripheries or short-direction left and right peripheries. Moreover, two or more deformation stopping frames 135 may be formed on the bottom periphery of the main frame 131 (see FIG. 5B). That is, a first deformation stopping frame 135a is formed at an outermost region of the periphery of the main frame 131 and a second deformation stopping frame 135b may be further formed at the inside (an inner region of the outermost region of the periphery of the main frame 131) of the first deformation stopping frame 135a. Another deformation stopping frame 135 may be additionally at the inside of second deformation stopping frame 135b according to acceptance of a bottom area of the main frame 131 or not.

The upper supporter 130 supporting the touch panel 110 is preferably formed as a member having predetermined rigidity in order to minimize vibration displacement for each partial position of the touch panel 110 by vibration transferred from a vibration generating member 160 to be described below.

An image display unit 150 is attached to the bottom surface of the touch panel 110. The image display unit 150 serves to output an image and includes the liquid crystal display device (LCD), the plasma display panel (PDP), the electroluminescence (EL), or the cathode ray tube (CRT). Further, as an adhesive member 141, a transparent material is preferably used to prevent a user from being interrupted to recognize the image outputted from the image display device and for example, an optical clear adhesive (OCA) may be used.

The image display unit 150 is supported by a bracket 170 in which a base plate 171 and a vibration stopping plate 175 are integrally configured. Specifically, an peripheral surface of the top surface of the base plate 171 is attached to the bottom surface of the main frame 131 and a center surface of the top surface of the base plate 171 contacts the bottom surface of the image display unit 150 to support the image display unit 150. In this case, an adhesive member 143 is formed on the top periphery of the base plate 171, such that the top periphery of the base plate 171 adheres to the bottoms surface of the main frame 131. A second technological characteristic of the present invention is a structure of the bracket 170, which will be described below in detail.

Figure 6:
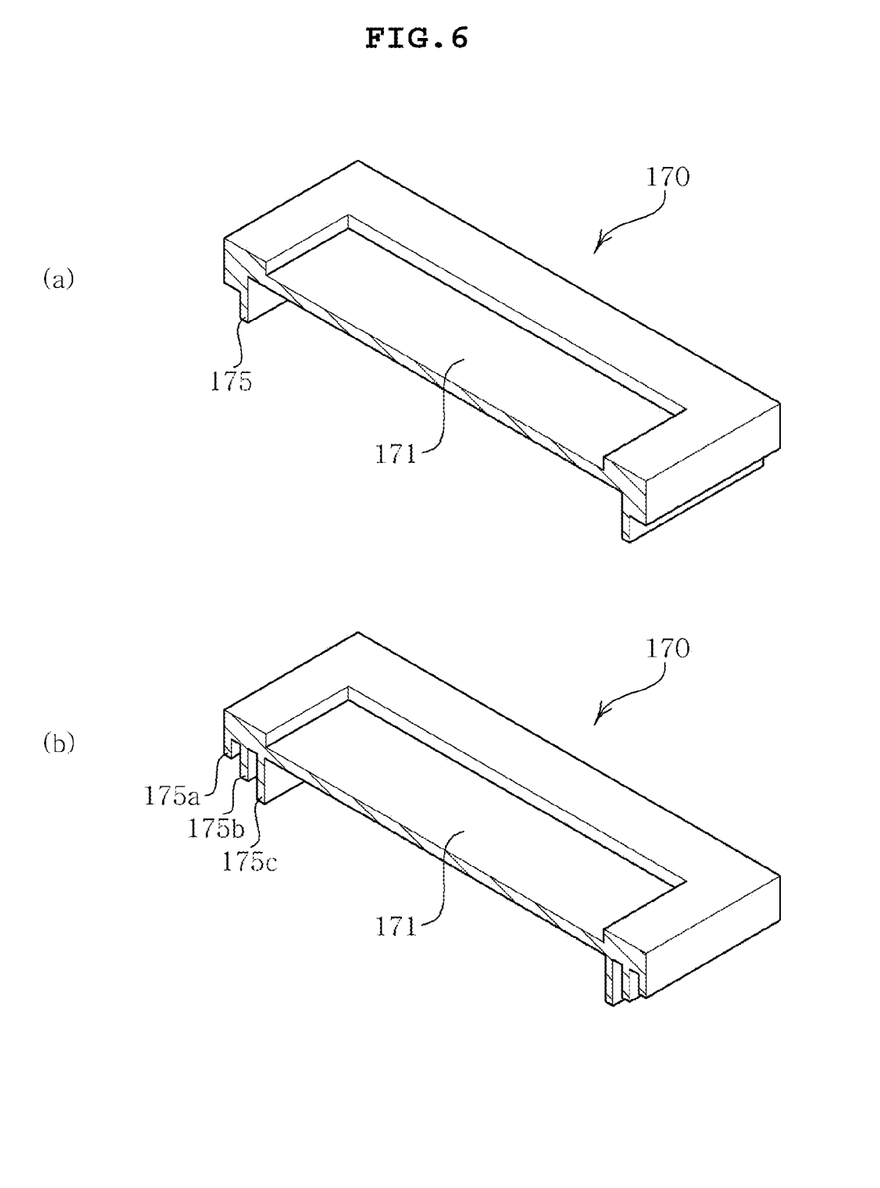
FIG. 6A is a perspective view of a bracket constituting the touch panel support structure of FIG. 3.
FIG. 6B is a perspective view of another bracket constituting the touch panel support structure of FIG. 3.

In this case, the vibration stopping plate 175 protrudes on the bottom surface of the base plate 171 constituting the bracket 170. That is, the vibration stopping plate 175 protrudes downward on the bottom periphery of the base plate 171 and the vibration stopping plate 175 protrudes downward from each of four peripheries of the base plate 171, which are connected to each other in a square shape. Further, the vibration stopping plate 175 may protrude on only long-direction left and right peripheries or short-direction left and right peripheries of the base plate 171. Moreover, two or more vibration stopping plate 175 may be formed on the bottom periphery of the base plate 171 (see FIG. 6B). That is, a first vibration stopping plate 175a is formed at an outermost region of the periphery of the base plate 171 and a second vibration stopping plate 175b may be further formed at the inside (an inner region of the outermost region of the periphery of the base plate 171) of the first vibration stopping plate 175a. Another vibration stopping plate (a third vibration stopping plate 175c) may be additionally formed at the inside of the second vibration stopping plate 175b according to acceptance of a bottom area of the base plate 171 or not.

Meanwhile, the buffering member 120 is interposed between the touch panel 110 and the upper supporter 130 and is preferably positioned on the bottom periphery of the touch panel 110, i.e., a bezel region of the touch panel 110. For example, the buffering member 120 may be configured by adopting an elastic member such as rubber and if the material has elastic force, there is no particular limit in the material. The buffering member 120 has two functions described below.

One function serves to prevent the touch panel 110 from being damaged by effectively absorbing shock transferred to the inside of the touch panel 110 from the outside of the touch panel 110. Since a transparent substrate (not shown), a transparent electrode (not shown), and the like constituting the touch panel 110 have very thin thicknesses as compared with the entire size, there is high possibility that the transparent substrate, the transparent electrode, and the like will be easily damaged by external shock. Further, since the upper supporter 130 supporting the touch panel 110 is formed as the member having predetermined rigidity in order to minimize the vibration displacement for each partial position of the touch panel 110 by the vibration transferred from the vibration generating member 160 to be described below, the buffering member 120 is interposed between the touch panel 110 and the upper supporter 130 that are vulnerable to shock to preferably buffer both constituent members.

The other function serves to decrease a gap between a vibration reference surface P1 and a non-vibration reference surface P0 with the buffering member 120 interposed therebetween when a plane position of the touch panel 110 is the non-vibration reference surface P0 in the case where vibration force is not applied to the touch panel 110 and an average vibration surface of the touch panel 110 is the vibration reference surface P1 in the case where the vibration force is applied to the touch panel 110. That is, since the vibration reference surface P1 is formed around the non-vibration reference surface P0 and vibrates autonomously, information by tactile can recognized relatively clearly.

Meanwhile, the vibration generating member 160 serves to apply vibration directly to the touch panel 110 and in the present invention, the vibration generating member 160 is attached to the bottom surface of the image display unit 150. Herein, the vibration generating member 160 controls a rated voltage by receiving pressure to maintain vibration so as for a user to feel vibration of a predetermined magnitude and as the vibration generating member 160, a linear vibrator in which a vibrator linearly vibrates via a spring member through interaction between a magnetic field generated from a magnet and an electric field generated from a coil or a piezoelectric actuator that shrinks or expands in a longitudinal direction by an external power to apply vibration sense may be used.

Meanwhile, a lower supporter 190 coupled to the main frame 131 to protect the image display unit 150 and the bracket 170 is formed in the upper supporter 130. Similarly as the upper supporter 130, the lower supporter 190 is also preferably formed as a member having predetermined rigidity in order to minimize the vibration displacement for each partial position of the touch panel 110 by the vibration transferred from the vibration generating member 160.

Figure 7A:
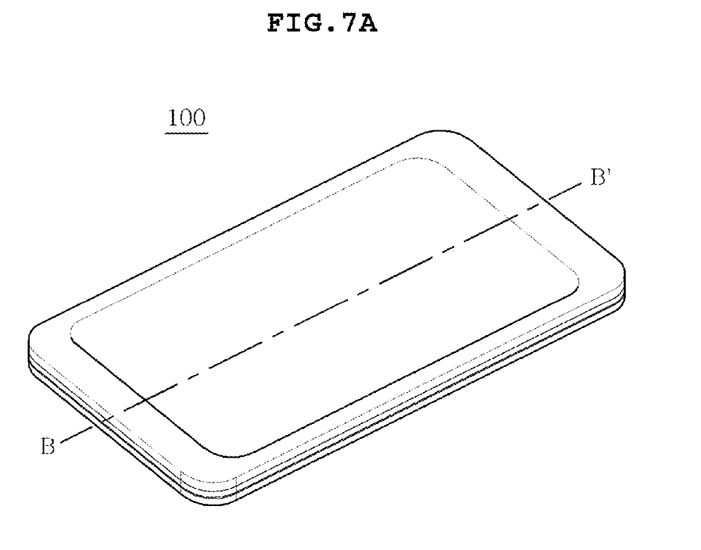
FIG. 7A is a perspective view of a touch panel by a support structure of the present invention.
Figure 7B:
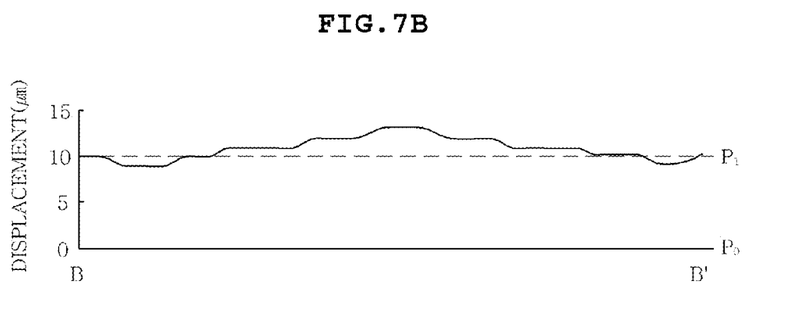
FIG. 7B is a diagram showing a displacement amount for each partial position of a touch panel by a support structure in the present invention.

The technical characteristic is in that the deformation stopping frame 135 protrudes on the upper supporters 130 and the vibration stopping plate 175 protrudes on the bracket 170. When the vibration force generated from the vibration generating member 160 is transferred to the touch panel 110, the touch panel 110 is transformed to a shape shown in the displacement graph of FIG. 1 or the simulation of FIG. 2. In the support structure 10 in the prior art, since the displacement amount (displacement width) varies for each position of the touch panel 110, signal sensing by user's tactile is non-uniform depending on a touch position. However, in the support structure 100 of the present invention, plate-like structures (deformation stopping frame 135 and vibration stopping plate 175) which are formed vertically downward from the plane of the touch panel 110 are additionally formed on the bottom surface of the upper supporter 130 supporting the touch panel 110 and the bottom surface of the bracket 170 to minimize the displacement width difference for each position of the touch panel 110. That is, when the touch panel 110 vibrates in a thickness direction (vertical direction), it is difficult to maintain the displacement width for each position by only the main frame 131 (the upper supporter 130) and the base plate 171 (the bracket 170) having predetermined rigidity uniformly, and as a result, the deformation stopping frame 135 and the vibration stopping plate that protrude vertically to the touch panel 110 are consecutively formed in a vertical direction and/or a horizontal direction on the bottom surface of the touch panel 110 to suppress the difference of the displacement width generated at each vertical position and/or each horizontal position. FIG. 7 is a diagram showing a displacement amount for each partial position of a touch panel 110 by a support structure 100 of the present invention. When FIG. 7 is compared with FIG. 1, the displacement difference for each position of the touch panel 110 is reduced.

Meanwhile, another technical characteristic of the present invention is in that the buffering member 120 is further formed between the touch panel 110 and the upper supporter 130 to decrease the gap between the vibration reference surface P1 and the non-vibration reference surface P0. That is, since the vibration reference surface P1 is formed around the non-vibration reference surface P0 and vibrates autonomously, the information by tactile can recognized relatively clearly. That is, when the graph of FIG. 7 is compared with the graph of FIG. 1, in the support structure 10 in the prior art, the non-vibration reference surface P0 is 0 μm and the vibration reference surface P1 is in the range of 0 to 30 μm, such that a displacement difference between the non-vibration reference surface P0 and the vibration reference surface P1 is approximately 15 μm, while in the support structure 100 of the present invention, the non-vibration reference surface P0 is 0 μm and the vibration reference surface P1 is approximately 10 μm, such that a displacement difference between the non-vibration reference surface P0 and the vibration reference surface P1 decreases as approximately 10 μm.

According to a preferred embodiment of the present invention, it is possible to uniformize a vibration width by minimizing a deviation of vibration displacement for each position of a touch panel.

Further, according to the preferred embodiment of the present invention, it is possible to safely protect the touch panel by effectively absorbing external shock through a cushion operation of a buffering member.

Although the embodiments of the present invention regarding a support structure 100 of a touch panel have been disclosed for illustrative purposes, those skilled in the art will appreciate that a variety of different modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A support structure of a touch panel, comprising:
a touch panel;
a buffering member attached to a periphery of the bottom surface of the touch panel; and
an upper supporter including a main frame having the top surface contacting the buffering member to support the touch panel, a side frame extending from an outer periphery of the main frame to surround a periphery of the side surface of the touch panel, and a deformation stopping frame protruding downward of the bottom periphery of the main frame to suppress warpage of the main frame, which are integrally formed therein.

2. The support structure of a touch panel as set forth in claim 1, further comprising:
an image display unit attached to the bottom surface of the touch panel; and
a bracket including a base plate in which a peripheral surface of the top surface thereof is attached to the bottom surface of the main frame and a center surface of the top surface contacts the bottom surface of the image display unit to support the image display unit and a vibration stopping plate protruding downward from the bottom surface of the base plate to suppress vibration of the base plate, which are integrally formed therein.

3. The support structure of a touch panel as set forth in claim 2, further comprising a lower supporter coupled with the main frame of the upper supporter to protect the image display unit and the bracket.

4. The support structure of a touch panel as set forth in claim 2, further comprising a vibration generating member attached to the bottom surface of the image display unit.

5. The support structure of a touch panel as set forth in claim 4, wherein the vibration generating member is a linear vibrator or a piezoelectric actuator.

6. The support structure of a touch panel as set forth in claim 2, further comprising two or more vibration stopping plates that protrude downward with being spaced toward the inside of an outermost periphery of the base plate constituting the bracket by a predetermined gap.

7. The support structure of a touch panel as set forth in claim 2, wherein an adhesive member is interposed between the image display unit and the touch panel.

8. The support structure of a touch panel as set forth in claim 1, further comprising two or more deformation stopping frames that protrude downward with being spaced toward the inside of an outermost periphery of the bottom surface of the main frame constituting the upper supporter by a predetermined gap.

\* \* \* \* \*